United States Patent
Leue et al.

(10) Patent No.: US 9,575,733 B2
(45) Date of Patent: Feb. 21, 2017

(54) DRAG AND DROP PORTLET DEPLOYMENT

(71) Applicant: International Business Machines Corporation, Armonk, NY (US)

(72) Inventors: Carsten Leue, Sindelfingen (DE); Jaspreet Singh, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 14/101,744

(22) Filed: Dec. 10, 2013

(65) Prior Publication Data

US 2015/0160820 A1    Jun. 11, 2015

(51) Int. Cl.
G06F 9/44       (2006.01)
G06F 3/0484    (2013.01)
G06F 3/0486    (2013.01)

(52) U.S. Cl.
CPC .............. *G06F 8/34* (2013.01); *G06F 3/0486* (2013.01); *G06F 3/04842* (2013.01)

(58) Field of Classification Search
CPC ...... G06F 8/34; G06F 3/04842; G06F 3/0486; G06F 17/3089
USPC ........................................................ 717/109
See application file for complete search history.

(56) References Cited

U.S. PATENT DOCUMENTS

| | | | |
|---|---|---|---|
| 7,590,687 B2 | 9/2009 | Bales et al. | |
| 7,596,620 B1 * | 9/2009 | Colton et al. | 709/226 |
| 7,707,514 B2 * | 4/2010 | Forstall | G06F 3/0486 |
| | | | 715/741 |
| 7,890,877 B2 | 2/2011 | Ritchy et al. | |
| 8,255,818 B2 | 8/2012 | Bales et al. | |
| 8,495,048 B2 | 7/2013 | Lauridsen et al. | |
| 8,635,548 B2 | 1/2014 | Facemire et al. | |
| 2006/0005137 A1 * | 1/2006 | Jolley | G06F 17/30873 |
| | | | 715/742 |
| 2006/0230059 A1 | 10/2006 | Etgen et al. | |
| 2007/0005733 A1 * | 1/2007 | Allamaraju | H04L 67/303 |
| | | | 709/219 |
| 2007/0073701 A1 * | 3/2007 | Miller | G06F 3/0486 |
| 2007/0112913 A1 * | 5/2007 | Bales | G06Q 10/10 |
| | | | 709/204 |
| 2007/0282673 A1 * | 12/2007 | Nagpal | G06Q 10/06 |
| | | | 705/7.13 |
| 2008/0127133 A1 * | 5/2008 | Aghara et al. | 717/140 |
| 2010/0192146 A1 | 7/2010 | Stay | |
| 2012/0303821 A1 | 11/2012 | Fletcher et al. | |
| 2015/0143247 A1 | 5/2015 | Diester et al. | |

OTHER PUBLICATIONS

Sarin,"Portlets in Action", Sep. 2011, Chapter 1, pp. 51.*
Jahia, "Portlet Integration Guide Jahia v6.5", Dec. 1, 2011, p. 1-29.*

(Continued)

*Primary Examiner* — Duy Khuong Nguyen
(74) *Attorney, Agent, or Firm* — David B. Woycechowsky (57) ABSTRACT

Deploying portlet(s) onto a displayed portal page by dragging and dropping portlet related artifacts from the IDE like portlet deployment descriptor node or a specific portlet node, and, responsively displaying the portlet(s), corresponding to the dropped node, in the displayed portal page. The updating of the portal page is accomplished by an internal IDE browser of a stand-alone type IDE working co-operatively with a remote portal server.

9 Claims, 3 Drawing Sheets

(56) References Cited

OTHER PUBLICATIONS

IBM, "Allow drag-and-drop of web content onto portal pages", An IP.com Prior Art Database Technical Disclosure, Original Publication Date: Dec. 12, 2008, IP.com No. IPCOM000177411D, IP.com Electronic Publication: Dec. 12, 2008.
IBM, "Help—Rational Software Architect for WebSphere Software", section: Deploying portlet projects, provided from search report dated Aug. 21, 2013, <http://pic.dhe.ibm.com/infocenter/rsawshlp/v7r5m0/index.jsp?topic=%2Fcom.ibm.etools.portal.doc%2Ftopics%2Ftdeployportlet.html[Sep. 12, 2013 2:33:59 PM>.
"Drag and drop", Wikipedia, the free encyclopedia, page last modified on Sep. 30, 2013 at 14:27, <http://en.wikipedia.org/wiki/Drag_and_drop>.
Leue et al., "Drag and Drop Portlet Deployment", U.S. Appl. No. 15/053,379, filed Feb. 25, 2016.

\* cited by examiner

DRAG AND DROP PORTLET DEPLOYMENT

BACKGROUND OF THE INVENTION

The present invention relates generally to the field of software and more particularly to software portlets and more particularly to user interfaces for software portlets that constitute a portal.

In graphical user interfaces, drag and drop is a pointing device gesture where a user selects a virtual object by "grabbing" it (that is, selecting it) and dragging it to a different location or onto another virtual object. "Drag and drop" can be used to invoke many kinds of actions, or create various types of associations between two abstract objects.

An IDE (integrated development environment or interactive development environment) is a software application that provides comprehensive facilities to computer programmers for end-to-end software development. An IDE normally consists of a source code editor, build automation tools, and a debugger. Some IDEs contain a compiler, interpreter, or both. IDEs are designed to maximize programmer productivity by providing tight-knit components with similar user interfaces. IDEs present a single program in which all software development lifecycle phases are done. As such they also provide integration with the server on which the software to be developed is finally deployed and published. This program typically provides many features for authoring, modifying, compiling, deploying, and debugging software. There are two types of IDEs: (i) desktop-based; and (ii) browser-based. A browser based IDE allows users to edit code in the browser, and see the results of executing the code. Desktop based IDE have been around for a while and are still preferred for doing heavy-lifting and conventional software development.

An "internal IDE browser" (not to be confused with a browser-based IDE) is a popular and integral component of desktop based stand-alone IDE. Because internal IDE browsers are usually run on development machines, the target servers to which software has to be published or deployed are usually on different machines altogether. Thus, this internal IDE browser is a window to that server, on the same or a different machine. All deploy and publish actions are visualized within the IDE using this internal IDE browser. Browser-based IDE do not have, or need, internal IDE browsers, and are not analogous to "stand-alone" IDE with respect to any browser features they may have.

A portal is a specially-designed web page which brings information together from diverse sources in a uniform way. Each information source gets its dedicated area on the page, with each dedicated area being called a "portlet." Portlets are usually "pluggable," meaning that they can be inserted into the larger portal by a user, system designer and/or template designer. In some portals, a user can configure the portlets. Some types of portals include: (i) web application hybrids; and (ii) intranet "dashboards" for executives and managers. The degree of uniformity of the display of the content may vary from user to user, or from portal to portal. Sometimes design emphasis is on a certain "metaphor" for configuring and customizing the presentation of the content and the chosen implementation framework and/or code libraries. Portals can provide a consistent look and feel, with access control and procedures for multiple applications and databases, as contrasted with the relatively haphazard presentation that can result from a user's use of different web entities at various URLs (uniform resource locators). Portlet standards are intended to enable software developers to create portlets that can be plugged into any portal supporting the standards.

SUMMARY

According to the present invention, there is a method, computer program product and/or system that performs the following actions (not necessarily in the following order): (i) displaying, on a first computer, a first portal page in an internal integrated development environment (IDE) browser hosted within an IDE; (ii) displaying a first portlet node within the IDE; (iii) receiving, from a user and through a user interface at the first computer, user input data indicating an action of dragging and dropping the first portlet node onto the displayed first portal page; (iv) sending, to a second computer over a communication network, open-portlet data, which open-portlet data indicates that a first portlet, corresponding to the first portlet node, is to be displayed in the first portal page; and (v) receiving, by the first computer over a communication network from the second computer, data corresponding to a display of an updated portal page which is updated to include a display of the first portlet.

DETAILED DESCRIPTION

Deploying portlet(s) onto a displayed portal page by dragging and dropping portlet related artifacts from the IDE like portlet deployment descriptor node or a specific portlet node, and, responsively displaying the portlet(s), corresponding to the dropped node, in the displayed portal page. The updating of the portal page is accomplished by an internal IDE browser of a stand-alone type IDE working co-operatively with a remote portal server. This Detailed Description section is divided into the following sub-sections: (i) Embodiment(s) And/Or General Comments; (ii) An Operating Environment For An Embodiment; (iii) An Embodiment; and (iv) Definitions.

I. Embodiment(s) and/or General Comments

Some embodiments of the present disclosure recognize that the following are the drawbacks of the current system(s) in place: (i) the conventional multi-step process for publishing a portlet from an IDE and placing it on a portal page is relatively burdensome for the software developer developing the portlet; (ii) conventional portlet publishing is not an optimized process from an end user point of view; (iii) conventional portlet publishing pre-requires a server instance to be created and configured in IDE; and (iv) conventional portlet publishing is non-intuitive to a novice user, and hence, is not user friendly.

Some embodiments of the present disclosure may have one, or more, of the following features, characteristics and/or advantages: (i) a software developer creates the portlet in IDE, and then "drags and drops" the portlet onto a portal page of the user's choice, which is opened in an internal IDE browser in the IDE; (ii) the portlet deployment is a one-step, intuitive drag and drop action from the developers perspective; (iii) the target server does not need to be configured separately (rather, it is automatically deduced, based on the portal page the user drops the portlet onto); and/or (iv) significant reduction of the overhead associated with software management.

A method according to one embodiment of the present disclosure is as follows: (i) a portlet (including a "portlet deployment descriptor node," or, more simply "portlet node") is created in the IDE; (ii) the target portal page is opened in the internal IDE browser; (iii) the developer drags and drops the portlet node from IDE onto the internal IDE browser at a desired location within the target portal page; (iv) a WAR file is created, dynamically containing "only" the portlet section of the portlet being dragged and dropped; (v) the "portal theme" is modified to sense the drag and drop operation, which operation accepts the dynamically created WAR file as input; (vi) the drop handler in the theme (JavaScript which runs in the browser) invokes a REST (representational state transfer) API (application programming interface) on the server that will act to upload the WAR file, along with information about the page that the WAR file was dropped onto; (vii) the server side REST installs the portlet in the WAR file or updates an existing WAR file; and (viii) a check is performed to determine if the portlet is already part of the target page (if not, the portlet is added; and (ix) if the portlet is already present, it is updated).

Some embodiments of the present disclosure may have one, or more, of the following features, and/or characteristics: (i) when the portlet deployment descriptor node is dragged and dropped onto the portal page, this will install all portlets defined in the portlet.xml onto the portal page; (ii) the drag and drop on an existing instance of the portlet on the page will merely update the existing portlet; (iii) the drag and drop of a portlet onto an empty spot on the portal page will add another instance of the portlet to the portal page; (iv) deletion of artifacts already sent to the portal, like a portlet from IDE, will not cause any action on the portal; and/or (v) the drop operation on the portal page will only be permitted if the user has sufficient access control rights.

With respect to item (iv) of the list in the preceding paragraph, assume a case where one or more portlets were installed on to portal from the IDE. Now, portlet definitions, of one or more of the deployed portlets, are deleted from the portlet deployment descriptor, in the IDE, it will not cause any change on the portal. For example, it will not delete the corresponding portlets from the portal as well. In this embodiment, once a portlet is installed on the server, the only way to remove it from there is to get it from the server. This is to avoid any unintended deletions of portlets while someone deletes it from IDE. With respect to item (v) in list in the preceding list, these access control rights can be enforced on the server as follows: (i) if the current user does not have sufficient access control rights, the drop zone would not be rendered, and therefore, the drop operation would not be permitted; and (ii) if the user sends a drop command, the drop operation will be allowed to fail if the server drop handler determines the user does not have proper permission. It is assumed the IDE user and the WP (web portal) user are same, and that the user has logged into the WP using the proper credentials.

Some embodiments of the present disclosure may include one, or more, of the following features, characteristics, and/or advantages: (i) the ability to add a drop zone to a portal theme that invokes a REST service with the above mentioned functionality; (ii) the ability to implement a drag source in IDE that dynamically wraps a portlet development project into a WAR file; (iii) the ability to communicate with the drop target in the portal page; (iv) using an HTTP (hypertext transfer protocol) server via a browser based window or URL (uniform resource locator), have the potential ability to deduce the generic portal server configuration, such that the explicit configuration in the IDE can be omitted; and (v) automatically deduce server information from the browser via drag and drop information using <link rel="service-document">.

In addition, some embodiments of the present disclosure may include one, or more, of the following features, characteristics, and/or advantages: (i) the ability to drag and drop the portlet project or portlet node, from IDE, onto the portal page of your choice, where the page is already open in the internal browser based IDE; (ii) the ability for direct installation and deployment of portlets into portal pages, from IDE, using WYSIWYG (what you see is what you get) drag and drop; (iii) the ability to process and translate complex IDE objects, that are portlet deployment units, in a manner that is appropriate for consumption via web browsers; (iv) the ability of handling the drag and drop of complex IDE objects, that are portlet deployment units, into internal browser based IDEs; and (v) the ability to communicate with a portal server, for the purpose of deploying portlet artifacts, without having to create a server instance in IDE.

Some embodiments of the present invention relate specifically to a desktop based IDE. The drag and drop is fully performed within the context and confines of the desktop based IDE, into the internal browser which is a part of the desktop based IDE. These embodiments are directed to a drag and drop of a special IDE item (portlet deployment descriptor node) into a browser instance. This is different than what happens in a conventional browser based IDE, where any drag and drop operation would be happening within the browser only. In contrast, the desktop based IDE embodiments of the present invention drag and drop something (that is, special IDE item) from outside a browser instance to inside a browser instance. Also, this special IDE item being dragged and dropped is packaged into an item portal server the browser understands for installing portlet, so the special IDE item is processed before the browser consumes it. In some embodiments, the drag and drop (dnd) is just one aspect of it, the entire scenario being, dnd of an IDE item (or node) leads to visual deployment of portlet, which is efficient and potentially advantageous.

II. Operating Environment for an Embodiment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

An embodiment of a possible hardware and software environment for software and/or methods according to the present invention will now be described in detail with reference to FIG. 1, which is a functional block diagram illustrating various portions of networked computers system 100, including: IDE sub-system 102; portal server sub-system (also called "portal server") 104; and communication network 114. IDE sub-system 102 includes: stand-alone IDE computer 200; communication unit 202; processor set 204; input/output (i/o) interface set 206; memory device 208; persistent storage device 210; display device 212; external device set 214; random access memory (RAM) device 230; cache memory device 232; and program 300.

IDE sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the First Embodiment sub-section of this Detailed Description section. Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as portal server 104. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

III. An Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
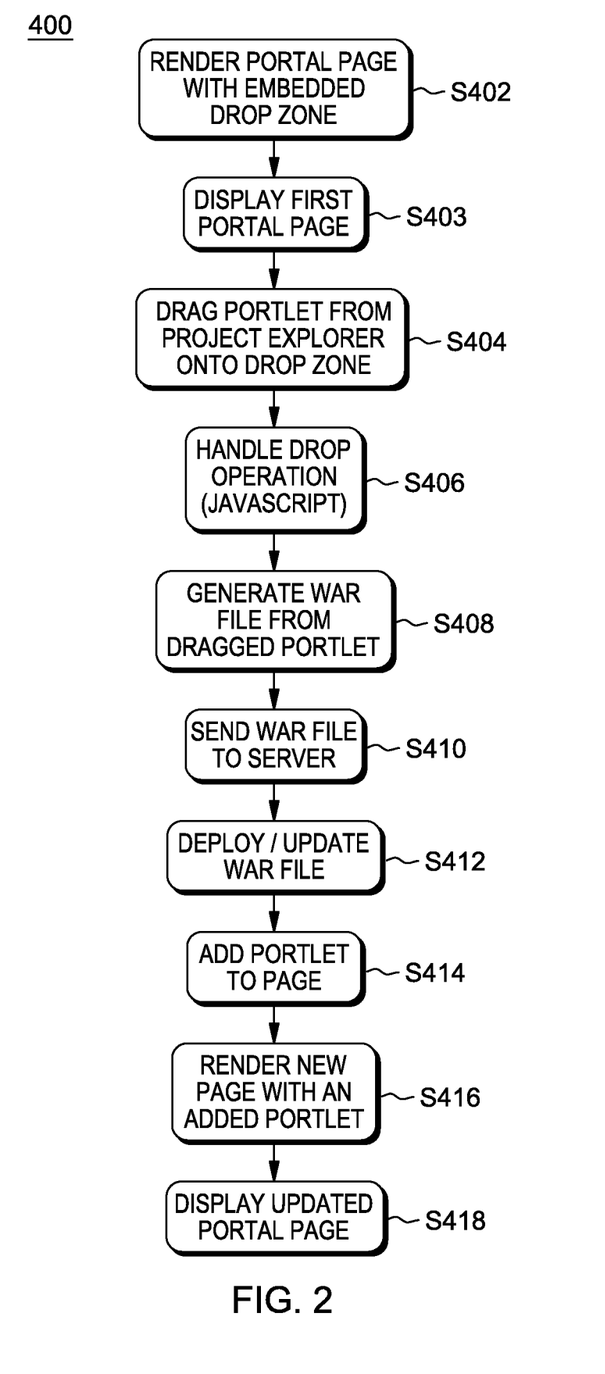
FIG. 2 is a first flowchart showing a process performed, at least in part, by the first embodiment computer system.
Figure 3:
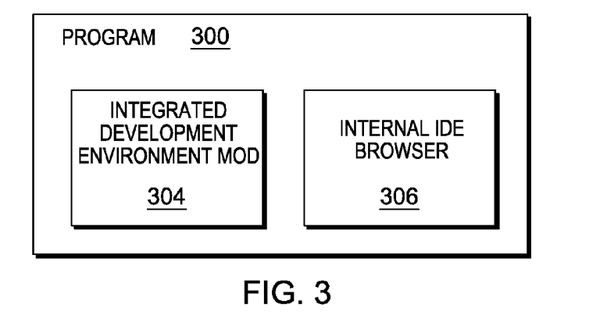
FIG. 3 is a schematic view of a portion of the first embodiment computer system.

FIG. 2 shows a flow chart 400 depicting a method according to the present invention. FIG. 3 shows program 300 for performing at least some of the method steps of flow chart 400. This method and associated software will now be discussed, over the course of the following paragraphs, with extensive reference to FIG. 2 (for the method step blocks) and FIG. 3 (for the software blocks).

Figure 1:
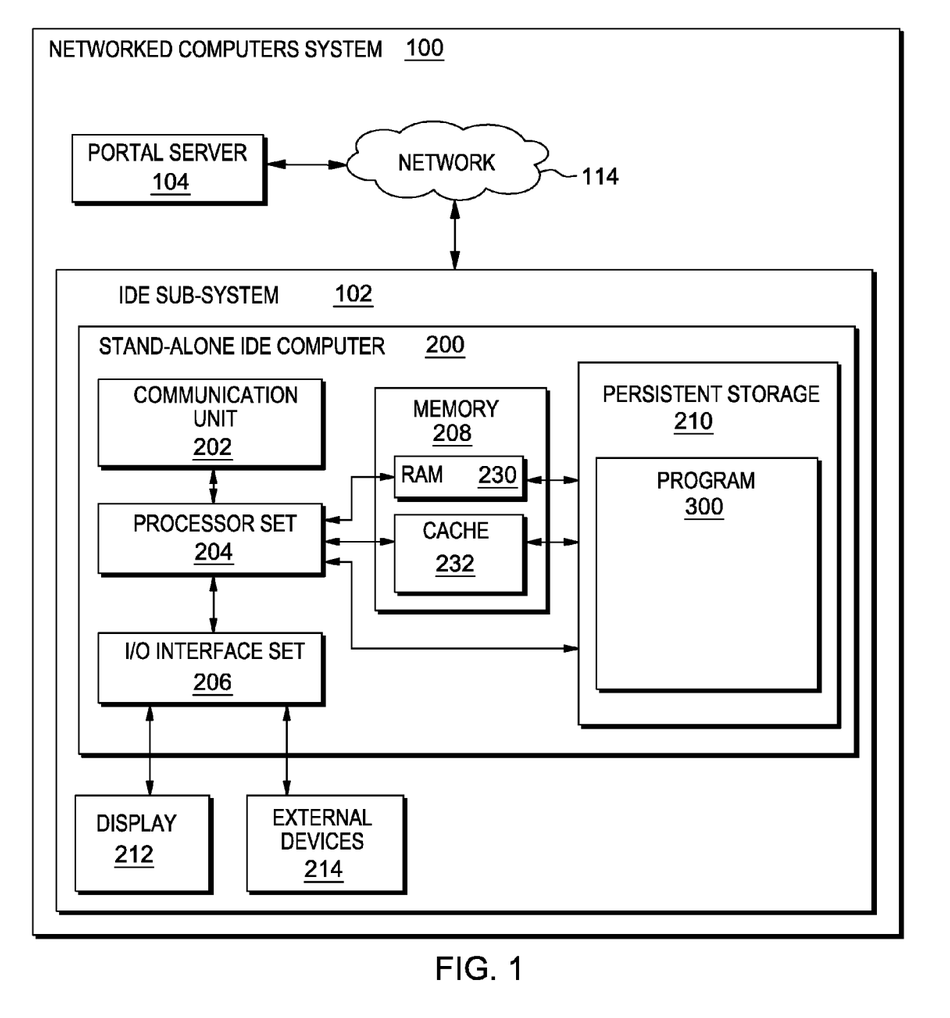
FIG. 1 is a schematic view of a first embodiment of a networked computers system according to the present invention.

Processing begins at step S402, where portal server sub-system 104 (see FIG. 1) renders a portal page with a drop zone and sends corresponding first portal page display data to internal IDE browser 306 of program 300 of stand-alone IDE computer 200 (see FIG. 1).

Figure 4:
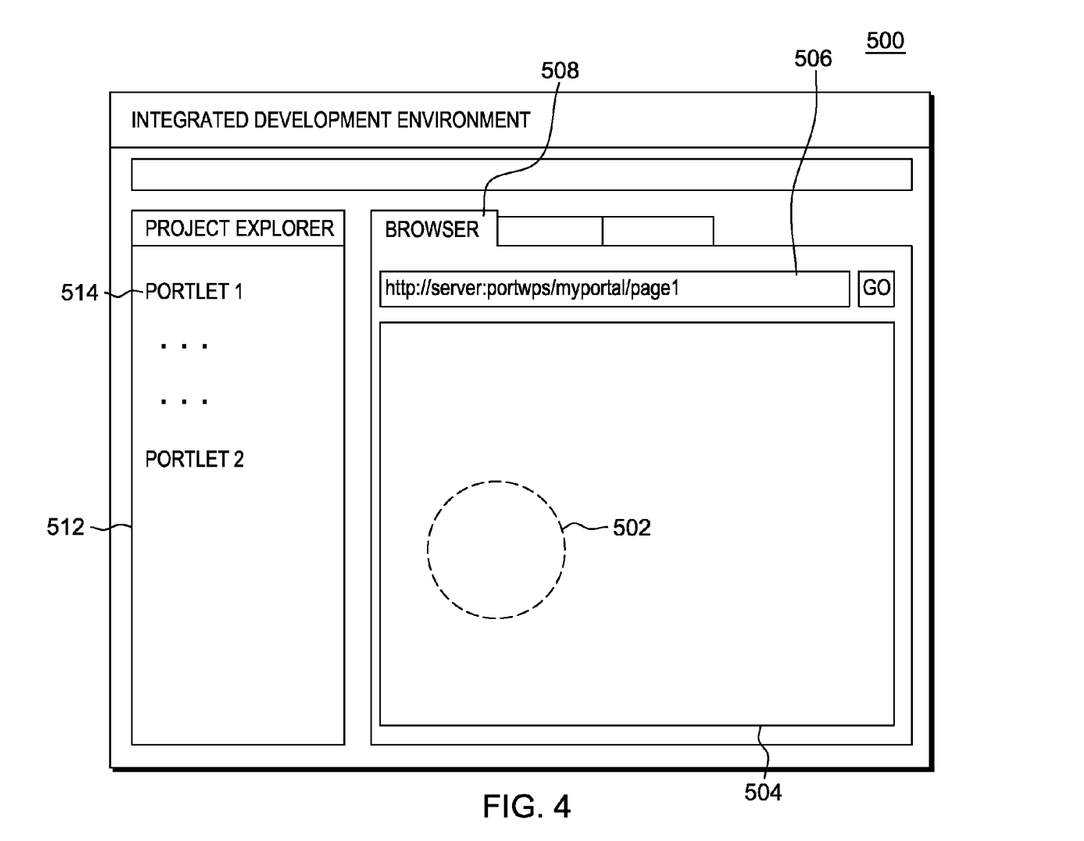
FIG. 4 is a screenshot generated by the first embodiment computer system.

Processing proceeds to step S403, where browser 306 displays the first portal page, along with a first portlet node as portions of an IDE display. The first portlet node represents a portlet that a software developer (also called the "user") is developing in the IDE provided by stand-alone IDE computer 200. FIG. 4 shows a screenshot 500 of this IDE display, which includes: drop zone 502, portal page 504; portal page address 506, internal IDE browser window 508; portlet node list 512; and first portlet node 514. At this point, a user has not dragged any portlet node to drop zone 502, so the portal page is not yet showing any open portals. Alternatively, some portals could already be opened in the portal page.

Processing proceeds to step S404, where the user (not shown) uses a mouse device of external device set 214 of IDE sub-system 102 (see FIG. 1) to drag and drop a selected portlet node (in this example, first portlet node 514) into drop zone 502. Display 212 shows this dragging and dropping as it happens, and as will be appreciated by those familiar with the drag and drop part of user interface art.

Processing proceeds to step S406, where the internal IDE browser handles the drop operation and, in response, sends data to IDE module ("mod") 304 to indicate that the user desires to open the portlet corresponding to first portlet node 514 in portal page 504.

Processing proceeds to step S408, where mod 304 generates a WAR format file based on the user's expressed desire to open the portlet, corresponding to the first portlet node, in the portal page that includes drop zone 502. Alternatively, other file formats (now known or to be developed in the future) can be used, so long as the format is one that will be recognized by the system's portal server.

Processing proceeds to step S410, where browser 306 sends the WAR file, with its indication of the dragged and dropped first portlet node, to portal server sub-system 104 over communication network 114.

Processing proceeds to steps S412, S414, and S416, where portal server sub-system 104 deploys and updates the first portal page to create an updated second portal page. The second portal page includes a display of the portlet corresponding to the first portlet node.

Processing proceeds to step S418, where the internal IDE browser receives and displays the second portal page. In this way, the user quickly and easily can view any of her portlets which she is developing in the IDE.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A method comprising:
   opening a first portal page in an IDE (integrated development) browser;
   providing, by a first computer, a user interface (UI) for an internal integrated development environment (IDE) browser hosted within an IDE, the UI including a display including a first portlet item and an IDE browser portion of the display;
   responsive to user input, dragging the first portlet item to the first portal page in the IDE browser portion;
   responsive to user input, dropping the first portlet item into the first portal page in the IDE browser portion;
   responsive to the dropping of the first portlet item into the first portal page in the IDE browser portion, generating a first WAR (web application archive) format file including the first portlet item;
   sending, by the first computer, to a portal server and over a communication network, the first WAR format file;
   receiving, by the portal server, from the first computer and over the communication network, the first WAR format file;
   invoking, by the portal server, a public REST (representational state transfer) API (application interface);
   responsive to the invocation of the public REST API, uploading, by the REST API on the portal server, the first WAR format file to a location from which it can be served; and
   responsive to a request made by a requestor, serving, by the portal server, the first WAR format file to the requestor.

2. The method of claim 1 further comprising:
   responsive to the dropping of the first portlet item onto the first portal page, installing all portlets defined in a portlet.xml onto the portal page.

3. The method of claim 1 wherein the first portal item is a portlet node.

4. A computer program product comprising:
   a non-transitory machine readable storage device; and
   computer code stored on the non-transitory machine readable storage device, with the computer code including instructions for causing a processor(s) set to perform operations including the following:
   opening a first portal page in an IDE (integrated development environment) browser,
   providing, by a first computer, a user interface (UI) for an internal integrated development environment (IDE) browser hosted within an IDE, the UI including a display including a first portlet item and an IDE browser portion of the display,
   responsive to user input, dragging the first portlet item to the first portal page in the IDE browser portion,
   responsive to user input, dropping the first portlet item into the first portal page in the IDE browser portion,
   responsive to the dropping of the first portlet item into the first portal page in the IDE browser portion, generating a first WAR (web application archive) format file including the first portlet item,
   sending, by the first computer, to a portal server and over a communication network, the WAR format file,
   receiving, by the portal server, from the first computer and over the communication network, the first WAR format file,
   invoking, by the portal server, a public REST (representational state transfer) API (application interface),
   responsive to the invocation of the public REST API, uploading, by the REST API on the portal server, the first WAR format file to a location from which it can be served, and
   responsive to a request made by a requestor, serving, by the portal server, the first WAR format file to the requestor.

5. The computer program product of claim 4 wherein the computer code further includes instructions for causing the processor(s) set to perform the following operation(s):

responsive to the dropping of the first portlet item onto the first portal page, installing all portlets defined in a portlet.xml onto the portal page.

6. The computer program product of claim 4 wherein the first portal item is a portlet node.

7. A computer system comprising:
a processor(s) set;
a machine readable storage device; and
computer code stored on the machine readable storage device, with the computer code including instructions for causing a processor(s) set to perform operations including the following:
opening a first portal page in an IDE (integrated development environment) browser,
providing, by a first computer, a user interface (UI) for an internal integrated development environment (IDE) browser hosted within an IDE, the UI including a display including a first portlet item and an IDE browser portion of the display,
responsive to user input, dragging the first portlet item to the first portal page in the IDE browser portion,
responsive to user input, dropping the first portlet item into the first portal page in the IDE browser portion,
responsive to the dropping of the first portlet item into the first portal page in the IDE browser portion, generating a first WAR (web application archive) format file including the first portlet item,
sending, by the first computer, to a portal server and over a communication network, the first WAR format file;
receiving, by the portal server, from the first computer and over the communication network, the first WAR format file,
invoking, by the portal server, a public REST (representational state transfer) API (application interface),
responsive to the invocation of the public REST API, uploading, by the REST API on the portal server, the first WAR format file to a location from which it can be served, and
responsive to a request made by a requestor, serving, by the portal server, the first WAR format file to the requestor.

8. The computer system of claim 7 wherein the computer code further includes instructions for causing the processor(s) set to perform the following operation(s):
responsive to the dropping of the first portlet item onto the first portal page, installing all portlets defined in a portlet.xml onto the portal page.

9. The computer system of claim 7 wherein the first portal item is a portlet node.

* * * * *